United States Patent
Terry et al.

(10) Patent No.: US 7,001,642 B2
(45) Date of Patent: *Feb. 21, 2006

(54) COMPOSITION FOR PROVIDING AN ABRASION RESISTANT COATING ON A SUBSTRATE WITH A MATCHED REFRACTIVE INDEX AND CONTROLLED TINTABILITY

(75) Inventors: Karl W. Terry, Huntington Beach, CA (US); Bryan S. Lembo, Newport Beach, CA (US)

(73) Assignee: SDC Technologies, Inc., Anaheim, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/706,551

(22) Filed: Nov. 12, 2003

(65) Prior Publication Data

US 2004/0097646 A1 May 20, 2004

Related U.S. Application Data

(63) Continuation of application No. 09/938,039, filed on Aug. 23, 2001, which is a continuation of application No. 09/553,583, filed on Apr. 20, 2000, now Pat. No. 6,342,097.

(60) Provisional application No. 60/130,767, filed on Apr. 23, 1999.

(51) Int. Cl.
    *B05D 3/00* (2006.01)

(52) U.S. Cl. ............ 427/387; 106/287.13; 106/287.14; 106/287.16; 524/366; 524/386; 524/430; 524/588; 524/783; 524/786; 524/789; 528/26; 528/34; 528/35

(58) Field of Classification Search ................ 524/858, 524/868, 430, 837, 356, 366, 379, 780, 783, 524/786, 789; 106/287.13, 287.16; 528/26, 528/34, 33, 35; 428/447
See application file for complete search history.

(56) References Cited

U.S. PATENT DOCUMENTS

| | | | |
|---|---|---|---|
| 3,780,132 A | 12/1973 | Lohr | |
| 3,922,440 A | 11/1975 | Wegworth et al. | |
| 4,027,073 A | 5/1977 | Clark | |
| 4,081,421 A | 3/1978 | Yoshida et al. | |
| 4,355,135 A * | 10/1982 | January | 524/767 |
| 4,390,373 A | 6/1983 | White et al. | |
| 4,405,679 A | 9/1983 | Fujioka et al. | |
| 4,442,168 A | 4/1984 | White et al. | |
| 4,485,130 A | 11/1984 | Lampin et al. | |
| 4,594,290 A | 6/1986 | Fischer et al. | |
| 4,756,827 A | 7/1988 | Mayer | |
| 5,013,608 A | 5/1991 | Guest et al. | |
| 5,013,788 A * | 5/1991 | Nagashima et al. | 524/767 |
| 5,102,695 A | 4/1992 | Guest et al. | |
| 5,120,811 A | 6/1992 | Glotfelter et al. | |
| 5,314,947 A | 5/1994 | Sarawagi | |
| 5,316,791 A | 5/1994 | Farber et al. | |
| 5,366,545 A * | 11/1994 | Yajima et al. | 106/286.4 |
| 5,367,019 A * | 11/1994 | Sawaragi | 524/780 |
| 5,789,082 A | 8/1998 | Treadway | |
| 5,789,476 A * | 8/1998 | Iryo et al. | 524/430 |
| 5,907,000 A | 5/1999 | Treadway | |
| 5,919,860 A | 7/1999 | Roesler et al. | |
| 5,958,514 A | 9/1999 | Havey et al. | |
| 6,001,163 A | 12/1999 | Havey et al. | |
| 6,057,039 A * | 5/2000 | Takeshita et al. | 428/447 |
| 6,342,097 B1 | 1/2002 | Terry et al. | |
| 6,346,331 B1 | 2/2002 | Harvey et al. | |
| 6,348,269 B1 | 2/2002 | Terry | |
| 6,538,092 B1 | 3/2003 | Terry et al. | |

FOREIGN PATENT DOCUMENTS

| | | |
|---|---|---|
| CA | 2071692 | 12/1992 |
| DE | 4118826 A1 | 12/1991 |

(Continued)

OTHER PUBLICATIONS

Chemical Abstract, vol. 126, No. 1, Jan. 1997, Columbus, Ohio, US; Abstract No. 9335, Kato, H., E.A.: "Siloxane coat compositions with improved resistance to abrasion, UV, and heat for plastic optical materials" XP002075220 (see abstract & JP 08 239 627 A (Ito Optical Ind Co. Ltd.)

(Continued)

*Primary Examiner*—Marc S Zimmer
(74) *Attorney, Agent, or Firm*—Dunlap, Codding & Rogers

(57) ABSTRACT

A process for providing a coating composition which, provides an abrasive resistant coating having a refractive index of the substrate and controlled tintability. The composition which, when applied to at least one surface of a substrate comprises an aqueous-organic solvent mixture containing a mixture of hydrolysis products and partial condensates of an epoxy-functional silane, a carboxylic acid functional compound selected from the group consisting of carboxylic acids, multifunctional carboxylic acids, anhydrides, and combinations thereof, a metal oxide composite colloid, a disilane and an effective amount of a leveling agent for permitting the aqueous-organic mixture to spread on the substrate and thereby provide substantially uniform contact of the aqueous-organic mixture with the substrate. The coating compositions may further include a mixture of hydrolysis products and partial condensates of one or more silane additives, a colloidal silica material, and a tetrafunctional silane.

34 Claims, No Drawings

FOREIGN PATENT DOCUMENTS

| | | |
|---|---|---|
| DE | 4020316 A1 | 1/1992 |
| EP | 0407174 A | 1/1991 |
| EP | 526975 A2 | 2/1993 |
| EP | 0601782 | 5/1997 |
| EP | 0570165 | 10/1997 |
| JP | 58141250 | 8/1983 |
| JP | 446975 | 2/1992 |
| JP | 4198379 | 7/1992 |
| WO | WO9516522 | 6/1995 |
| WO | WO9629154 | 9/1996 |
| WO | WO9846692 A | 10/1998 |

OTHER PUBLICATIONS

"Cycloaliphatic Expoxide Based Sol-Gel Derived Materials"; Better Ceramics Through Chemistry VI, Material Research Society Symposium Proceedings, 1994, V. 346 Sigel, Domszy and Welch.

"New Type of A Sol-Gel-Derived Inorganic-Organic Nanocomposite"; Better Ceramics Through Chemistry VI, Material Research Society Symposium Proceedings, 1994, V. 346, Kasemann, Schmidt, Wintrich.

Abstract for JP 07-291817.

Abstract for JP 09-118757.

* cited by examiner

COMPOSITION FOR PROVIDING AN ABRASION RESISTANT COATING ON A SUBSTRATE WITH A MATCHED REFRACTIVE INDEX AND CONTROLLED TINTABILITY

CROSS REFERENCE TO RELATED APPLICATIONS

This is a continuation of U.S. patent application Ser. No. 09/938,039, filed Aug. 23, 2001, entitled an COMPOSITION FOR PROVIDING AN ABRASION RESISTANT COATING ON A SUBSTRATE WITH A MATCHED REFRACTIVE INDEX AND CONTROLLED TINTABILITY, which is a continuation of U.S. Ser. No. 09/553,583, filed Apr. 20, 2000, entitled COMPOSITION FOR PROVIDING AN ABRASION RESISTANT COATING ON A SUBSTRATE WITH A MATCHED REFRACTIVE INDEX AND CONTROLLED TINTABILITY, now U.S. Pat. No. 6,342,097 which claims priority und 35 U.S.C. § 119(e) of U.S. Provisional Ser. No. 60/130,767 filed Apr. 23, 1999, entitled COMPOSITION FOR PROVIDING AN ABRASION RESISTANT COATING ON A SUBSTRATE WITH A MATCHED REFRACTIVE INDEX AND CONTROLLED TINTABILITY, the contents of which are hereby expressly incorporated in their entirety by reference Not Applicable.

STATEMENT REGARDING FEDERALLY SPONSORED RESEARCH OR DEVELOPMENT

BACKGROUND OF THE INVENTION

1. Field of the Invention

The present invention relates to coating compositions as well as methods of making and using same, and more particularly but not by way of limitation, to coating compositions which, when cured, provide substantially transparent coatings having abrasion resistance, a matched refractive index to that of the substrate, and which can be tailored to control the extent of tint absorption.

The present invention also relates to liquid coating compositions as well as methods of making and using same having improved abrasion resistance and improved stability wherein the liquid coating compositions are derived from aqueous-organic solvent mixtures containing effective amounts of an epoxy-functional silane, a carboxylic acid component, a colloidal metal oxide component, and a disilane.

2. Description of Prior Art

Silica based coatings deposited on plastic materials are useful for their abrasion resistance and weatherability and thus extend the useable life of the plastic material. These coatings, in most cases, do not match the refractive index of the plastic material and allow for interference patterns to arise due to the refractive index mismatch between the cured coating film and the plastic substrate material. This mismatch leads to increased reflectivity of the coated plastic material and to exacerbation of material flaws due to the increased reflectivity.

BRIEF SUMMARY OF THE INVENTION

The present invention provides compositions and methods of using and making said compositions, having improved stability which, when applied to a variety of substrates and cured, form transparent coatings which have abrasion resistant properties, a matched refractive index to that of the substrate, and which can be tailored to control the extent of tint absorption.

Broadly, the coating compositions of the present invention comprise an aqueous-organic solvent mixture containing from about 10 to about 90 weight percent, based on the total solids of the composition, of a mixture of hydrolysis products and partial condensates of an epoxy-functional silane, from about 1 to about 90 weight percent, based on the total weight of the composition, of a carboxylic acid functional compound selected from the group consisting of carboxylic acids, multifunctional carboxylic acids, anhydrides, and combinations thereof, from about 1 to 90 weight percent, based on the total solids of the composition, of a metal oxide composite colloid, and from about 1 to 75 weight percent, based on the total solids of the composition, of a disilane.

The coating compositions of the present invention may further include from about 0.1 to about 50 weight percent, based on the total solids of the composition of a mixture of hydrolysis products and partial condensates of one or more silane additives, from about 0.1 to 75 weight percent, based on the total solids of the composition, of a colloidal silica material, from about 0.1 to 75 weight percent, based on the total solids of the composition, of a tetrafunctional silane.

It is an object of the present invention to provide coating compositions and methods of making and using said compositions having improved stability, which form transparent coatings upon curing. It is a further object of the present invention to provide stable coating compositions, which form transparent coatings upon curing and which also have improved adhesion properties, improved resistance to crack formation, and a matched refractive index to that of the substrate.

Other objects, advantages and features of the present invention will become apparent upon reading the following detailed description in conjunction with the appended claims.

DETAILED DESCRIPTION OF THE INVENTION

Before explaining at least one embodiment of the invention in detail, it is to be understood that the invention is not limited in its application to the details of construction and the arrangement of the components set forth in the following description. The invention is capable of other embodiments or of being practiced or carried out in various ways. Also, it is to be understood that the phraseology and terminology employed herein is for the purpose of description and should not be regarded as limiting.

The present invention relates to coating compositions having improved stability which, when applied to a variety of substrates and cured, form substantially transparent coatings which possess improved adhesion, improved resistance to crack formation and have a matched refractive index to that of the substrate.

For measuring the refractive indexes of the cured coating compositions, each composition was applied to a cleanly etched lead-silicate glass plaque by dip coating at 2 inches per minute and curing for a period of 1 hour at 120° C. The refractive indexes were measured using a Bausch and Lomb Abbe-3L refractometer. Either diiodomethane or 1-bromonaphthalene was used as the contact liquid. The standard procedures for measurement and instrument maintenance contained in the operator's manual for the Bausch and Lomb Abbe-3L refractometer were used for data gathering and processing. For testing coated samples, coating compositions were applied to ADC lenses and cured at a temperature of from 95° C. to 120° C. for a period of 3 hours. Semi-quantitative assessments of the extent of cracking and adhesion were made using the following tests.

For testing adhesion of the coated articles the procedures of ASTM D-3359, i.e. the tape test, were followed.

A typical test for cracking, and adhesion consists of immersion of the coated article in boiling water or boiling tap water tint for a period of time, e. g. 1 hour, followed by inspection for crack formation and testing for adhesion. Specifically, lenses were tested in BPI Black Tint (Brain Power, Inc.) under boiling conditions. In this test a bottle of BPI tint (approximately 100 grams) was diluted to about 900 grams with tap water and brought to a boil. The coated article was immersed in the boiling solution for a period of 30 minutes. The coated article was removed from the tint solution and inspected for cracking and tested for adhesion.

For measuring the control of tint absorption, a typical test consists of exposing the coated article to the tint mixture above which is in either deionized or tap water for a period of fifteen minutes at a temperature in the range between 90° C. and 100° C. The light transmittance is measured, using a Gardner XL-835 Colorimeter, in 15 minute intervals.

For testing abrasion resistance of coated substrates, any of a number of quantitative test methods may be employed, including the Taber Test (ASTM D-4060), the Tumble Test and Standard Method for the Modified Bayer Test, which is described in The AR Council of America Standard Testing Procedures section 5.2.5 and is a variation of the test method, ASTM F735-81. In addition, there are a number of qualitative test methods that may be used for measuring abrasion resistance, including the Steel Wool Test and the Eraser Test. In the Steel Wool Test and the Eraser Test, coated substrate samples are scratched under reproducible conditions (constant load, frequency, etc.). The scratched test samples are then compared and rated against standard samples. A semi-quantitative application of these test methods involves the use of an instrument, such as a Spectrophotometer or a Colorimeter, for measuring the scratches on the coated substrate as a haze gain.

The measured abrasion resistance of a cured coating on a substrate, whether measured by the Modified Bayer Test, Taber Test, Steel Wool Test, Eraser Test, Tumble Test, etc. is a function, in part, of the cure temperature and cure time. In general, higher temperatures and longer cure times result in higher measured abrasion resistance. Normally, the cure temperature and cure time are selected for compatibility with the substrate; although, sometimes less than optimum cure temperatures and cure times are used due to process and/or equipment limitations. It will be recognized by those skilled in the art that other variables, such as coating thickness and the nature of the substrate, will also have an effect on the measured abrasion resistance. In general, for each type of substrate and for each coating composition there will be an optimum coating thickness. The optimum cure temperature, cure time, coating thickness, and the like, can be readily determined empirically by those skilled in the art.

In the test method employed to determine the abrasion resistance of the coating compositions of the present invention, a commercially available alundum (grain code 1524, 12 grit, alundum ZF) sold by Norton Advanced Ceramics of Canada Inc., 8001 Daly Street, Niagara Falls, Ontario, was used as the abrasive material. In this test, 540 grams alundum was loaded into a 9$\frac{5}{16}$"×6$\frac{3}{4}$" cradle fitted with four lenses. Each set of four lenses, typically two poly(diethylene glycol-bis-allyl carbonate) lenses, herein referred to as ADC lenses, and two coated lenses, were subjected to a 4 inch stroke (the direction of the stroke coinciding with the 9$\frac{5}{16}$" length of the cradle) at an oscillation frequency of 300 strokes per minute for a total of 4 minutes. The lens cradle was repositioned by turning 180 degrees after the initial 2 minutes of oscillations. Repositioning of the cradle was used to reduce the impact of any inconsistencies in the oscillating mechanism. The ADC reference lenses used were Silor 70 mm piano FSV lenses, purchased through Essilor of America, Inc. of St. Petersburg, Fla. The above described procedure is slightly modified from that which is described by the AR Council of America by increasing the weight of the alundum to accommodate the increased surface area of the larger cradle. The cradle described above holds 4 lenses. The haze generated on the lenses was then measured on a Gardner XL-835 Colorimeter. The haze gain for each lens was determined as the difference between the initial haze on the lenses and the haze after testing. The ratio of the haze gain on the ADC reference lenses to the haze gain on the coated sample lenses was then reported as the resultant abrasion resistance of the coating material. A ratio of greater than 1 indicates a coating which provides greater abrasion resistance than the uncoated ADC reference lenses. This ratio is commonly referred to as the Bayer ratio, number or value. Coatings with high abrasion resistance possess larger Bayer numbers than coatings with lower abrasion resistance.

It should be understood that: (a) the descriptions herein of coating systems which contain epoxy-functional silanes, tetrafunctional silanes, disilanes, silane additives which do not contain an epoxy-functional group, and the carboxylic acid component, refer to the incipient silanes and carboxylic acid components from which the coating system is formed, (b) when the epoxy-functional silanes, tetrafunctional silanes, disilanes, and silane additives which do not contain an epoxy-functional group, are combined with the aqueous-organic solvent mixture under the appropriate conditions, a hydrolysis reaction occurs resulting in partially or fully hydrolyzed species, (c) the resultant fully or partially hydrolyzed species can combine to form mixtures of multifunctional oligomeric siloxane species, (d) the oligomeric siloxane species may or may not contain pendant hydroxy and pendant alkoxy moieties and will be comprised of a silicon-oxygen matrix which contains both silicon-oxygen siloxane linkages and silicon-oxygen carboxylic acid component linkages, and (e) the resultant mixtures are dynamic oligomeric suspensions that undergo structural changes which are dependent upon a multitude of factors including; temperature, pH, water content, catalyst concentration, and the like.

The coating compositions of the present invention comprise an aqueous-organic solvent mixture containing from about 10 to about 90 weight percent, based on the total solids of the composition, of a mixture of hydrolysis products and partial condensates of an epoxy-functional silane, from about 1 to about 90 weight percent, based on the total weight of the composition, of a carboxylic acid functional compound selected from the group consisting of carboxylic acids, multifunctional carboxylic acids, anhydrides, and combinations thereof, from about 1 to 90 weight percent, based on the total solids of the composition, of a metal oxide composite colloid, and from about 1 to 75 weight percent, based on the total solids of the composition, of a disilane.

The amount of epoxy-functional silane, carboxylic acid component, metal oxide composite sol, and disilane employed can vary widely and will generally be dependent upon the properties desired in the coating composition and the cured coating, as well as the end use of the substrate to which the coating composition is applied. Generally, however, desirable results can be obtained where the molar ratio of the epoxy-functional silane component to the disilane component, and the colloidal metal oxide component are present in the coating composition at a ratio of from about 0.05:1 to 2:1 and the molar ratio of the disilane silane component to the metal oxide composite colloid present in the coating composition is present in a range of from about 0.01:1 to about 50:1.

While the presence of water in the aqueous-organic solvent mixture is necessary to form hydrolysis products of the silane components of the mixture, the actual amount of water can vary widely. However, a sufficient amount of water must be present in the aqueous-organic solvent mixture to provide a substantially homogeneous coating mixture of hydrolysis products and partial condensates of the alkoxy functional silanes (i.e., the epoxy-functional silane and other silane additive components) which, when applied and cured on an article, provides a substantially transparent coating. Such coatings can be obtained by employing a stoichiometric amount of water, e.g., as required for the hydrolysis of the sum of the hydrolyzable alkoxy groups on the alkoxy silane components in the coating mixture.

The abrasion resistance of the coated article is affected by the concentration of water in the incipient coating mixture, as well as the presence and concentration of a condensation catalyst. For example, coating mixtures which contain a low concentration of water (e.g. a stoichiometric concentration of water) require a optional mineral acid hydrolysis co-catalyst to ensure the sufficient hydrolysis necessary for the formation of a homogeneous coating mixture and a condensation catalyst to obtain coating compositions which possess the desired abrasion resistance properties after curing. It is preferred that the amount of water present in the aqueous-organic solvent mixture range from about 1 to about 10 equivalents of water for each hydrolyzable alkoxy group. The effective amount of water and the effective amount and type of catalyst can be determined empirically.

The solvent constituent of the aqueous-organic solvent mixture of the coating compositions of the present invention can be any solvent or combination of solvents which is compatible with the epoxy-functional silane, the carboxylic acid component, the colloidal metal oxide component, the colloidal silica component, the disilane, and the tetrafunctional silane. For example, the solvent constituent of the aqueous-organic solvent mixture may be an alcohol, ether, a glycol or glycol ether, a ketone, an ester, a glycolether acetate and mixtures thereof. Alcohols which can be employed as the solvent constituent are represented by the formula ROH where R is an alkyl group containing from 1 to about 10 carbon atoms. Examples of alcohols which can be employed as the solvent constituent of the aqueous-organic solvent mixture employed in the practice of the present invention are methanol, ethanol, propanol, isopropanol, butanol, isobutanol, secondary butanol, tertiary butanol, cyclohexanol, pentanol, octanol, decanol, and mixtures thereof.

Glycols, ethers, and glycol ethers which can be employed as the solvent constituent of the aqueous-organic solvent mixture are represented by the formula $R^1$—$(OR^2)_x$—$OR^1$ where x is 0, 1, 2, 3 or 4, $R^1$ is hydrogen or an alkyl group containing from 1 to about 10 carbon atoms and $R^2$ is an alkylene group containing from 1 to about 10 carbon atoms and combinations thereof.

Examples of glycols, ethers and glycol ethers having the above-defined formula and which may be used as the solvent constituent of the aqueous-organic solvent mixture of the coating compositions of the present invention are di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol and mixtures thereof. In addition to the above, cyclic ethers such as tetrahydrofuran and dioxane are suitable ethers for the aqueous-organic solvent mixture.

Examples of ketones suitable as the organic solvent constituent of the aqueous-organic solvent mixture are acetone, diacetone alcohol, methyl ethyl ketone, cyclohexanone, methyl isobutyl ketone and combinations thereof.

Examples of esters suitable for the aqueous-organic solvent mixture are ethyl acetate, n-propyl acetate, n-butyl acetate and combinations thereof.

Examples of glycolether acetates suitable as the organic solvent constituent of the aqueous-organic solvent mixture are propylene glycol methyl ether acetate, dipropylene glycol methyl ether acetate, ethyl 3-ethoxypropionate, ethylene glycol ethyl ether acetate and combinations thereof.

The epoxy-functional silane useful in the formulation of the coating compositions of the present invention can be any epoxy-functional silane compatible with the carboxylic acid component, the metal oxide composite colloid, and the disilane component of the coating composition which provides a coating composition that, upon curing, produces a substantially transparent, abrasion resistant coating with a refractive index substantially corresponding to the refractive index of the substrate to which the coating composition is applied and which exhibits improved adhesion and improved resistance to crack formation. Generally, such epoxy-functional silanes are represented by the formula $R^3_x Si(OR^4)_{4-x}$ where x is an integer of 1, 2 or 3, $R^3$ is H, an alkyl group, a functionalized alkyl group, an alkylene group, an aryl group, an alkyl ether, and combinations thereof containing from 1 to about 10 carbon atoms and having at least 1 epoxy-functional group, and $R^4$ is H, an alkyl group containing from 1 to about 5 carbon atoms, an acetyl group, a —$Si(OR^5)_{3-y}R^6_y$ group where y is an integer of 0, 1, 2, or 3, and combinations thereof where $R^5$ is H, an alkyl group containing from 1 to about 5 carbon atoms, an acetyl group, or another —$Si(OR^5)_{3-y}R^6_y$ group and combinations thereof, and $R^6$ is H, an alkyl group, a functionalized alkyl group, an alkylene group, an aryl group, an alkyl ether, and combinations thereof containing from 1 to about 10 carbon atoms which may also contain an epoxy-functional group.

Examples of such epoxy-functional silanes are glycidoxymethyltrimethoxysilane, 3-glycidoxypropyltrihydroxysilane, 3-glycidoxypropyldimethylhydroxysilane, 3-glycidoxypropyltrimeth-oxysilane, 3-glycidoxypropyltriethoxysilane, 3-glycidoxypropyldimethoxymethylsilane, 3-glycidoxypropyldimethylmethoxysilane, 3-glycidoxypropyltributoxysilane, 1,3-bis(glycidoxypropyl)tetramethyldisiloxane, 1,3-bis(glycidoxypropyl)tetramethoxydisiloxane, 1,3-bis(glycidoxypropyl)-1,3-dimethyl-1,3-dimethoxydisiloxane, 2,3-epoxypropyltrimethoxysilane, 3,4-epoxybutyltrimethoxysilane, 6,7-epoxyheptyltrimethoxysilane, 9,10-epoxydecyltrimethoxysilane, 1,3-bis(2,3-epoxypropyl)tetramethoxydisiloxane, 1,3-bis(6,7-epoxy-heptyl)

tetramethoxydisiloxane, 2-(3,4-epoxycyclohexyl)ethyltrimethoxysilane, and the like.

The coating compositions of the present invention contain any carboxylic acid component compatible with the epoxy-functional silane, the colloidal metal oxide component, the colloidal silica component, the tetrafunctional silane, and the disilane. The carboxylic acid component is capable of interacting with the hydrolysis products and partial condensates of the epoxy-functional silane and the tetrafunctional silane to provide a coating composition which, upon curing, produces a substantially transparent, abrasion resistant coating having improved adhesion, improved crack resistance and which possesses a refractive index substantially corresponding to the refractive index of the substrate to which it is applied.

Carboxylic acid component as used herein is understood to include mono- and multi-functional carboxylic acids as well as anhydrides, which produce mono- and multifunctional carboxylic acids. Examples of carboxylic acids, which can be in the coating compositions of the present invention, include acetic acid, acrylic acid, methacrylic acid, formic acid, propionic acid, butanoic acid, benzoic acid, malic acid, aconitic acid (cis, trans), itaconic acid, succinic acid, malonic acid, glutaric acid, adipic acid, pimelic acid, suberic acid, azelaic acid, sebacic acid, cyclohexyl succinic acid, 1,3,5 benzene tricarboxylic acid, 1,2,4,5 benzene tetracarboxylic acid, 1,4-cyclohexanedicarboxylic acid, 1,3-cyclohexanedicarboxylic acid, 1,1-cyclohexanediacetic acid, 1,3-cyclohexanediacetic acid, 1,3,5-cyclohexanetricarboxylic acid and unsaturated dibasic acids such as fumaric acid and maleic acid and combinations thereof.

Examples of anhydrides which can be employed to produce the carboxylic acid component of the coating compositions of the present invention include the anhydrides of the above mentioned carboxylic acids such as acetic anhydride, propionic anhydride, acrylic anhydride, methacrylic anhydride and the cyclic anhydrides of the above mentioned dibasic acids such as succinic anhydride, itaconic anhydride, glutaric anhydride, trimellitic anhydride, pyromellitic anhydride, phthalic anhydride and maleic anhydride and combinations thereof.

Optionally, in addition to the carboxylic acid component of the coating composition, a mineral acid such as, for example, hydrochloric acid or nitric acid, can be used as a co-hydrolysis catalyst for the hydrolysis of the silane compounds described herein.

The disilane components useful in the coating compositions of the present invention can be any disilane which is compatible with the carboxylic acid component, the metal oxide composite colloid, and the epoxy functional silane component of the coating composition and which provides a coating composition which, upon curing, produces a substantially transparent, abrasion resistant coating having a refractive index substantially corresponding to the refractive index of the substrate to which the coating composition is applied and which exhibits improved adhesion and improved resistance to crack formation.

Generally, such disilanes are represented by the formula $(R^7O)_x R^8_{3-x}Si-R^9_y-SiR^{10}_{3-x}(OR^{11})_x$; where x is 0, 1, 2 or 3 and y is 0 or 1; $R^8$ and $R^{10}$ are either H or an alkyl group containing from about 1 to 10 carbon atoms, a functionalized alkyl group, an alkylene group, an aryl group, an alkylpolyether group and combinations thereof; $R^7$ and $R^{11}$ are either H, an alkyl group containing from about 1 to 10 carbon atoms, an acetyl group, and combinations thereof. If y is 1 then $R^9$ can be an alkylene group containing from about 1 to 12 carbon atoms, an alkylenepolyether containing from about 1 to 12 carbon atoms, an aryl group, an alkylene substituted aryl group, an alkylene group which may contain one or more olefins, or an oxygen or sulfur atom. If x=0 then $R^8$ and $R^{10}$ is a chlorine or bromine atom. If y=0 then there is a direct silicon-silicon bond.

Examples of disilanes satisfying the above defined formula include; bis(triethoxysilyl)ethane, bis(triethoxysilyl)methane, bis(trichlorosilyl)methane, bis(triethoxysilyl)ethylene, 1,3 bistriethoxysilylethane, hexaethoxydisiloxane, hexaethoxydisilane.

The metal oxide colloidal component of the present invention may consist of a single component metal oxide colloid or a complex composite metal oxide colloid consisting of more than one metal oxide component. The refractive index of the colloidal metal oxide component should be sufficiently higher than the coating mixture so the addition of effective amounts of the colloidal metal oxide component can yield a desirable refractive index for the entire coating composition. The colloidal metal oxide component may contain any combination of titania, zirconia, tin oxide, antimony oxide, iron oxide, lead oxide, and/or bismuth oxide for purposes of increasing the refractive index. The colloidal metal oxide component may also contain alumina and/or silica.

In general, it is preferred that the colloidal metal oxide component used in the present invention consist of a composite mixture of two or more metal oxide components listed above where at least one of the metal oxide components present in the composite mixture is neither alumina nor silica. Examples of commercially available metal oxide colloidal materials and composite metal oxide component materials are the Suncolloid series AMT-130S, HIS-33M, HIT-30M, and HIT-32M from Nissan Chemical Industries LTD., Optolake 1130F-2(A-8), 2130F-2(A-8), Optolake ARC-7, and Queen Titanic-11-1 from Catalyst and Chemical Industries LTD.

Proper selection of the amounts and type of the colloidal metal oxide component, the epoxy-functional silane, the carboxylic acid component, the colloidal silica component, the tetrafunctional silane component, the disilane component, and if desired, the optional silane component and condensation catalyst will yield a cured coating material with a refractive index in the range from 1.4 to greater than 1.7.

The coating compositions of the present invention are also stable with respect to aging, both in terms of performance and solution stability. The aging of the coating composition is characterized by a gradual increase in viscosity, which eventually renders the coating compositions unusable due to processing constraints. The coating compositions of the present invention, when stored at temperatures of 5° C. or lower have usable shelf lives of 3–4 months. During this period, the abrasion resistance of the cured coatings does not significantly decrease with time. The abrasion resistant coating compositions which provide index-matching properties described in the present invention are achieved through the unique combination of an epoxy-functional silane, a carboxylic acid component, a composite metal oxide colloid, a colloidal silica component, and a tetrafunctional silane. The coating compositions may optionally include other materials which may: (a) enhance the stability of the coating compositions; (b) increase the abrasion resistance of cured coatings produced by the coating compositions; (c) improve processing of the coating compositions; and (d) provide other desirable properties to the coating composition and the cured product of the coating compositions.

The present invention may include a colloidal silica component, which can be either an aqueous or non-aqueous based material. The colloidal silica component may exist in the coating composition from about 0.1 to 75 weight percent, based on the total solids of the composition. The colloidal silica is an aqueous or non-aqueous solvent dispersion of particulate silica and the various products differ principally by particle size, silica concentration, pH, presence of stabilizing ions, solvent makeup, and the like. Colloidal silica is commercially available under a number of different tradename designations, including Nalcoag® (Nalco Chemical Co., Naperville, Ill.); Nyacol® (Nyacol Products, Inc., Ashland, Mass.); Snowtex® (Nissan Chemical Industries, LTD., Tokyo, Japan); Ludox® (DuPont Company, Wilmington, Del.); and Highlink OG® (Hoechst Celanese, Charlotte, N.C.). It should be noted that substantially different product properties can be obtained through the selection of different colloidal silicas.

Colloids which possess acidic pH values and very slightly basic pH values with low levels of sodium are preferred. These colloidal silica materials provide an increase in the abrasion resistance and provide a resistance to crack formation, which can result from exposure of the cured coatings to boiling tap water tint baths, vide supra. Examples of preferred colloidal silica materials are Nalco®1042 and Nalco®1040 and the like. Basic colloidal silica materials which possess higher pH values and/or a higher concentration of sodium ions result in cured coating compositions which possess abrasion resistance which is lower than that which results from the use of the preferred colloidal silica materials and are not preferred. An example of a material, which is not preferred, is Nalco® 1115 and the like.

Tetrafunctional silanes may also be useful in the formulation of the coating compositions of the present invention and may exist from about 0.1 to about 75 weight percent based on the total solids of the composition. The tetrafunctional silanes are represented by the formula $Si(OR^7)_4$ where $R^7$ is H, an alkyl group containing from 1 to about 5 carbon atoms and ethers thereof, an $(OR^7)$ carboxylate, a $—Si(OR^8)_3$ group where $R^8$ is a H, an alkyl group containing from 1 to about 5 carbon atoms and ethers thereof, an $(OR^7)$ carboxylate, or another $—Si(OR^8)_3$ group and combinations thereof.

Examples of tetrafunctional silanes represented by the formula $Si(OR^7)_4$ are tetramethyl orthosilicate, tetraethyl orthosilicate, tetrapropyl orthosilicate, tetraisopropyl orthosilicate, tetrabutyl ortho-silicate, tetraisobutyl orthosilicate, tetrakis(methoxyethoxy) silane, tetrakis(methoxypropoxy) silane, tetrakis(ethoxyethoxy) silane, tetrakis(methoxyethoxyethoxy)silane, trimethoxyethoxysilane, dimethoxydiethoxysilane, triethoxymethoxysilane, poly(dimethoxysiloxane), poly(diethoxysiloxane), poly(dimethoxy-diethoxysiloxane), tetrakis(trimethoxysiloxy)silane, tetrakis-(triethoxysiloxy)silane, and the like. In addition to the $R^7$ and $R^8$ substituants described above for the tetrafunctional silane, $R^7$ and $R^8$ taken with oxygen $(OR^7)$ and $(OR^8)$ can be carboxylate groups. Examples of tetrafunctional silanes with carboxylate functionalities are silicon tetracetate, silicon tetrapropionate and silicon tetrabutyrate.

The coating compositions of the present invention may further include from about 0.1 to about 50 weight percent, based on the weight of total solids of the coating compositions, of a mixture of hydrolysis products and partial condensates of one or more silane additives (i.e, trifunctional silanes, difunctional silanes, monofunctional silanes, and mixtures thereof). The selection of the silane additives incorporated into the coating compositions of the present invention will depend upon the particular properties to be enhanced or imparted to either the coating composition or the cured coating composition. The silane additives can be represented by the formula $R^9_xSi(OR^{10})_{4-x}$ where x is a 1, 2 or 3; $R^9$ is H, or an alkyl group containing from 1 to about 10 carbon atoms, a functionalized alkyl group, an alkylene group, an aryl group an alkyl ether group and combinations thereof; $R^{10}$ is H, an alkyl group containing from 1 to about 10 carbon atoms, an acetyl group, a $—Si(OR^{10})_3$ group and combinations thereof.

Examples of silane additives represented by the above-defined formula are methyltrimethoxysilane, ethyltrimethoxysilane, propyltrimethoxysilane, butyltrimethoxysilane, isobutyltrimethoxy-silane, hexyltrimethoxysilane, octyltrimethoxysilane, decyltrimethoxysilane, cyclohexyltrimethoxysilane, cyclohexylmethyltrimethoxysilane, 3-methacryloxypropyltrimethoxysilane, vinyltrimethoxysilane, allyltrimethoxysilane, dimethyldimethoxysilane, 2-(3-cyclohexenyl)ethyltrimethoxysilane, 3-cyanopropyltrimethoxysilane, 3-chloropropyltrimethoxysilane, 2-chloroethyltrimethoxysilane, phenethyltrimethoxysilane, 3-mercaptopropyltrimethoxysilane, 3-aminopropyltrimethoxysilane, phenyltrimethoxysilane, 3-isocyanopropyltrimethoxysilane, N-(2-aminoethyl)-3-aminopropyltrimethoxysilane, 4-(2-aminoethylaminomethyl) phenethyltrimethoxysilane, chloromethyltriethoxysilane, 2-chloroethyltriethoxysilane, 3-chloropropyltriethoxysilane, phenyltriethoxysilane, ethyltriethoxysilane, propyltriethoxysilane, butyltriethoxysilane, isobutyltriethoxysilane, hexyltriethoxysilane, octyltriethoxysilane, decyltriethoxysilane, cyclohexyltriethoxysilane, cyclohexylmethyltriethoxysilane, 3-methacryloxypropyltriethoxysilane, vinyltriethoxysilane, allyltriethoxysilane, [2-(3-cyclohexenyl)ethyltriethoxysilane, 3-cyanopropyltriethoxy-silane, 3-methacrylamidopropyltriethoxysilane, 3-methoxypropyltrimethoxysilane, 3-ethoxypropyltrimethoxysilane, 3-propoxypropyl-trimethoxysilane, 3-methoxyethyltrimethoxysilane, 3-ethoxyethyltrimethoxysilane, 3-propoxyethyltrimethoxysilane, 2-[methoxy(poly-ethyleneoxy)propyl]heptamethyltrisiloxane, [methoxy(polyethylene-oxy)propyl]trimethoxysilane, [methoxy(polyethyleneoxy)ethyl]-trimethoxysilane, [methoxy(polyethyleneoxy)propyl]triethoxysilane, [methoxy(polyethyleneoxy)ethyl]triethoxysilane, and the like.

Although a condensation catalyst is not an essential ingredient of the coating compositions of the present invention, the addition of a condensation catalyst can affect abrasion resistance and other properties of the coating including stability, tinting capacity, porosity, cosmetics, caustic resistance, water resistance and the like. When employing a condensation catalyst, the amount of catalyst used can vary widely, but will generally be present in an amount from about 0.05 to about 20 weight percent, based on the total solids of the composition.

Examples of catalysts which can be incorporated into the coating compositions of the present invention are (i) metal acetylacetonates, (ii) diamides, (iii) imidazoles, (iv) amines and ammonium salts, (v) organic sulfonic acids and their amine salts, (vi) alkali metal salts of carboxylic acids, (vii) alkali metal hydroxides, (viii) fluoride salts, and (ix) organostannanes. Thus, examples of such catalysts include for group (i) such compounds as aluminum, zinc, iron and cobalt acetylacetonates; group (ii) dicyandiamide; for group (iii) such compounds as 2-methylimidazole, 2-ethyl-4-methylimidazole and 1-cyanoethyl-2-propylimidazole; for group (iv), such compounds as benzyldimethylamine, and 1,2-diaminocyclohexane; for group (v), such compounds as trifluoromethanesulfonic acid; for group (vi), such compounds as sodium acetate, for group (vii), such compounds as sodium hydroxide, and potassium hydroxide, for group (viii), tetra n-butyl ammonium fluoride, and for group (ix), dibutyltin dilaurate, and the like.

An effective amount of a leveling or flow control agent can be incorporated into the composition to more evenly spread or level the composition on the surface of the substrate and to provide substantially uniform contact with the substrate. The amount of the leveling or flow control agent can vary widely, but generally is an amount sufficient to provide the coating composition with from about 10 to about 50,000 ppm of the leveling or flow control agent. Any conventional, commercially available leveling or flow control agent which is compatible with the coating composition and the substrate and which is capable of leveling the coating composition on a substrate and which enhances wetting between the coating composition and the substrate can be employed. The use of leveling and flow control agents is well known in the art and has been described in the "Handbook of Coating Additives" (ed. Leonard J. Calbo, pub. Marcel Dekker), pg 119–145.

Examples of such leveling or flow control agents which can be incorporated into the coating compositions of the present invention include organic polyethers such as TRITON X-100, X-405, N-57 from Rohm and Haas, silicones such as Paint Additive 3, Paint Additive 29, Paint Additive 57 from Dow Corning, SILWET L-77, and SILWET L-7600 from OSi Specialties, and fluorosurfactants such as FLUORAD FC-171, FLUORAD FC-430 and FLUORAD FC-431 from 3M Corporation.

In addition, other additives can be added to the coating compositions of the present invention in order to enhance the usefulness of the coating compositions or the coatings produced by curing the coating compositions. For example, ultraviolet absorbers, antioxidants, and the like can be incorporated into the coating compositions of the present invention, if desired.

The coating compositions of the present invention can be prepared by a variety of processes to provide stable coating compositions, which, upon curing, produce substantially transparent abrasion resistant coatings having improved abrasion resistance, resistance to crack formation, and a matched refractive index.

The preferred method for preparing the coating compositions of the present invention consists of the initial hydrolysis of the epoxy-functional silane by addition of the silane to a mixture of deionized water, the acid component, and the solvent constituent. After sufficient time for the hydrolysis, the disilane is added and the resultant mixture is allowed to stir for a sufficient period of time for hydrolysis. When desired, a condensation catalyst and/or a surfactant for leveling and flow improvement may be added to the final coating composition.

The coating compositions of the present invention can be applied to solid substrates by conventional methods, such as flow coating, spray coating, curtain coating, dip coating, spin coating, roll coating, etc. to form a continuous surface film. Any substrate compatible with the compositions can be coated with the compositions, such as plastic materials, wood, paper, metal, printed surfaces, leather, glass, ceramics, glass ceramics, mineral based materials and textiles. The compositions are especially useful as coatings for synthetic organic polymeric substrates in sheet or film form, such as acrylic polymers, poly(ethyleneterephthalate), polycarbonates, polyamides, polyimides, copolymers of acrylonitrile-styrene, styrene-acrylonitrile-butadiene copolymers, polyvinyl chloride, butyrates, polyethylene and the like. Transparent polymeric materials coated with these compositions are useful as flat or curved enclosures, such as windows, liquid crystal display screens, skylights and windshields, especially for transportation equipment. Plastic lenses, such as acrylic or polycarbonate ophthalmic lenses, can also be coated with the compositions of the invention.

By choice of proper formulation, application conditions and pretreatment (including the use of primers) of the substrate, the coating compositions of the present invention can be adhered to substantially all solid surfaces. Abrasion resistant coatings having improved adhesion and resistance to cracking can be obtained from coating compositions of the present invention by heat curing at temperatures in the range of from about 50° C. to about 200° C. for a period of from about 5 minutes to about 18 hours. The coating thickness can be varied by means of the particular application technique, but coatings having a thickness of from about 0.5 to about 20 microns, and more desirably from about 1 to about 10 microns, are generally utilized.

In order to further illustrate the present invention, the following examples are given. However, it is to be understood that the examples are for illustrative purposes only and are not to be construed as limiting the scope of the subject invention.ed.

EXAMPLES

Procedure

Etched poly(diethylene glycol-bis-allyl carbonate) lenses and plaques (referred to as ADC lenses or ADC plaques) were use for coating and testing. The ADC lenses and plaques were etched by contact with a 10% potassium hydroxide solution containing propylene glycol methyl ether and water for a period of about 10 minutes. The lenses and/or plaques were coated by dip coating using a specified withdrawal rate in units of inches per minute (ipm). The lenses and/or plaques were cured at a temperature of 110° C. for 3 hours. The lenses and/or plaques were subjected to the afore-mentioned test procedures to determine adhesion, resistance to cracking and abrasion resistance. The 1.7 $R_I$ glass plaques were cleaned by etching in 20 percent KOH followed by rinsing with D.I. water. The coating was applied to the 1,7 $R_I$ plaques by dipping at 2 ipm followed by curing for 1 hour at 110° C. The $R_I$ was measured according to the procedure described vide supra.

Example 1

55.5 grams of GPTMS were added dropwise to a stirring solution of 94.1 grams of deionized water, 94.1 grams of propylene glycol methyl ether (PMOH), and 8.7 grams of acetic acid (AcOH). After stirring for a period of 4 hours 55.5 grams of Bis(triethoxysilyl)ethane (BSE) were added dropwise and resulting mixture was stirred overnight. 92.0 grams of Optolake2130f-2(A-8), a colloidal metal oxide, were added dropwise to the above mixture while stirring. The resulting mixture was stirred for 4 hours to yield a coating composition.

Example 1A 1.6 grams of a solution of FC-430 (3M), 10 weight percent in PMOH, were added to 190 grams of the coating composition, as described in example 1. The coating composition was left to stir for an additional 20 minutes after the addition of the FC-430 to insure mixing. This coating composition was applied to etched ADC lenses, ADC plaques, and 1.7 $R_I$ glass plaques, according to the procedure above, at a withdrawal rate of 2 ipm to provide a cured coating having a thickness of about 2.2 microns, a refractive index of about 1.59, and a Bayer number of 6.6. Exposure of a coated ADC plaque to boiling tap water tint for a period of 15 minutes yielded a coated article with 89 percent L.T.

Example 1B 1.9 grams of dicyandiamide (DCDA) were added to 188.1 grams of the coating composition, described in example 1 above, followed by dilution with 6.8 grams of a 50 weight percent mixture of PMOH in deionized water. The mixture was left to stir overnight followed by addition of a 1.5 gram solution of FC-430 (3M) 10 weight percent in PMOH. This coating composition was applied to etched ADC lenses, ADC plaques, and 1.7 $R_I$ glass plaques, according to the procedure above, at a withdrawal rate of 2 ipm to provide a cured coating having a thickness of about 2.3 microns, a refractive index of about 1.58, and a Bayer number of 9.3. Exposure of a coated ADC plaque to boiling tap water tint for a period of 15 minutes yielded a coated article with 84 percent L.T.

Example 2

50.1 grams of GPTMS were added dropwise to a stirring solution of 104.1 grams of deionized water, 104.1 grams of PMOH, and 8.5 grams of itaconic acid (ITA). After stirring for a period of 4 hours 50.1 grams of BSE were added dropwise and resulting mixture was stirred overnight. 83.1 grams of Optolake2130f2(A-8), a colloidal metal oxide, were added dropwise to the above mixture while stirring. The resulting mixture was stirred for 4 hours to yield a coating composition.

Example 2A 1.6 grams of a solution of FC-430 (3M), 10 weight percent in PMOH, were added to 190 grams of the coating composition, as described in example 2. The coating composition was left to stir for an additional 20 minutes after the addition of the FC-430 to insure mixing. This coating composition was applied to etched ADC lenses, ADC plaques, and 1.7 $R_I$ glass plaques, according to the procedure above, at a withdrawal rate of 2 ipm to provide a cured coating having a thickness of about 2.3 microns, a refractive index of about 1.58, and a Bayer number of 5.1. Exposure of a coated ADC plaque to boiling tap water tint for a period of 15 minutes yielded a coated article with 78 percent L.T.

Example 2B 1.7 grams of dicyandiamide (DCDA) were added to 188.3 grams of the coating composition, described in example 2 above, followed by dilution with 6.0 grams of a 50 weight percent mixture of PMOH in deionized water. The mixture was left to stir overnight followed by addition of a 1.5 gram solution of FC-430 (3M) 10 weight percent in PMOH. This coating composition was applied to etched ADC lenses, ADC plaques, and 1.7 $R_I$ glass plaques, according to the procedure above, at a withdrawal rate of 2 ipm to provide a cured coating having a thickness of about 2.1 microns, a refractive index of about 1.60, and a Bayer number of 10.1. Exposure of a coated ADC plaque to boiling tap water tint for a period of 15 minutes yielded a coated article with 87 percent L.T.

Example 3A 74.5 grams of GPTMS were added dropwise to a stirring solution of 158.5 grams of deionized water, 158.5 grams of PMOH, and 12.8 grams of ITA. After stirring for a period of 1 hour, a stirred mixture of 47.8 grams of BSE and 18.8 grams of TEOS were added dropwise and resulting mixture was stirred overnight. The resulting mixture was split into 3, 117 gram portions. To one portion, 41.3 grams of Optolake2130f-2(A-8), a colloidal metal oxide, were added dropwise, and the resulting mixture was stirred overnight to produce a coating composition. 39.8 grams of a 4.5 weight percent solution of DCDA in PMOH were added to the coating composition and the resulting mixture was stirred overnight followed by addition of 0.15 grams of a 10 weight percent solution of PA-57 in PMOH and further stirring for 20 minutes. This coating composition was applied to etched ADC lenses, ADC plaques, and 1.7 $R_I$ glass plaques, according to the procedure above, at a withdrawal rate of 2 ipm to provide a cured coating having a thickness of about 2.1 microns, a refractive index of about 1.60, and a Bayer number of 6.0. Exposure of a coated ADC plaque to boiling tap water tint for a period of 30 minutes yielded a coated article with 42 percent L.T.

Example 3B 73.3 grams of GPTMS were added dropwise to a stirring solution of 158.3 grams of deionized water, 158.3 grams of PMOH, and 12.6 grams of ITA. After stirring for a period of 1 hour, a stirred mixture of 58.9 grams of BSE and 11.5 grams of TEOS were added dropwise and resulting mixture was stirred overnight. The resulting mixture was split into 3, 119 gram portions. To one portion, 40.6 grams of Optolake2130f-2(A-8), a colloidal metal oxide, were added dropwise, and the resulting mixture was stirred overnight to produce a coating composition. 37.8 grams of a 4.5 weight percent solution of DCDA in PMOH were added to the coating composition and the resulting mixture was stirred overnight followed by addition of 0.15 grams of a 10 weight percent solution of PA-57 in PMOH and further stirring for 20 minutes. This coating composition was applied to etched ADC lenses, ADC plaques, and 1.7 $R_I$ glass plaques, according to the procedure above, at a withdrawal rate of 2 ipm to provide a cured coating having a thickness of about 1.9 microns, a refractive index of about 1.60, and a Bayer number of 5.8. Exposure of a coated ADC plaque to boiling tap water tint for a period of 30 minutes yielded a coated article with 85 percent L.T.

Example 4

48.3 grams of GPTMS were added dropwise to a stirring solution of 109.0 grams of deionized water, 109.0 grams of IPA, and 8.3 grams of ITA. After stirring for a period of 2 hours, a stirred mixture of 31.0 grams of BSE and 2.4 grams of TEOS were added dropwise and resulting mixture was stirred overnight.

Example 4A

To 154 grams of the mixture in example 4 were added 4.1 grams of Nalco 1042 colloidal silica, followed by stirring for 4 hours. To this mixture 40.2 grams of Optolake2130f-2(A-8), a colloidal metal oxide, were added dropwise, and the resulting mixture was stirred overnight to produce a coating composition. 0.15 grams of a 10 weight percent solution of PA-57 in PMOH were added to the above mixture, followed by further stirring for 20 minutes. This coating composition was applied to etched ADC lenses, ADC plaques, and 1.7 $R_I$ glass plaques, according to the procedure above, at a withdrawal rate of 2 ipm to provide a cured coating having a thickness of about 2.0 microns, a refractive index of about 1.60, and a Bayer number of 4.2. Exposure of a coated ADC plaque to boiling tap water tint for a period of 30 minutes yielded a coated article with 81 percent L.T.

Example 4B

To example 4A above were added 3.4 grams of solid DCDA and the mixture was stirred overnight to produce a coating composition. 0.15 grams of a 10 weight percent solution of PA-57 in PMOH were added to the above composition, followed by further stirring for 20 minutes. This coating composition was applied to etched ADC lenses, ADC plaques, and 1.7 $R_I$ glass plaques, according to the procedure above, at a withdrawal rate of 2 ipm to provide a cured coating having a thickness of about 2.1 microns, a refractive index of about 1.60, and a Bayer number of 5.3. Exposure of a coated ADC plaque to boiling tap water tint for a period of 30 minutes yielded a coated article with 68 percent L.T.

Example 5

48.5 grams of GPTMS were added dropwise to a stirring solution of 109.3 grams of deionized water, 109.3 grams of IPA, and 8.3 grams of ITA. After stirring for a period of 2 hours, a stirred mixture of 31.1 grams of BSE and 2.4 grams of TEOS were added dropwise and resulting mixture was stirred overnight.

Example 5A

To 154 grams of the mixture in example 10 were added 3.5 grams of Nalco 1040 colloidal silica, followed by stirring for 4 hours. To this mixture 40.2 grams of Optolake2130f-2(A-8), a colloidal metal oxide, were added dropwise, and the resulting mixture was stirred overnight to produce a coating composition. 0.15 grams of a 10 weight percent solution of PA-57 in PMOH were added to the above mixture, followed by further stirring for 20 minutes. This coating composition was applied to etched ADC lenses, ADC plaques, and 1.7 $R_I$ glass plaques, according to the procedure above, at a withdrawal rate of 2 ipm to provide a cured coating having a thickness of about 1.9 microns, a refractive index of about 1.60, and a Bayer number of 4.3. Exposure of a coated ADC plaque to boiling tap water tint for a period of 30 minutes yielded a coated article with 63 percent L.T.

Example 5B

To example 11A above were added 3.5 grams of solid DCDA and the mixture was stirred overnight to produce a coating composition. 0.15 grams of a 10 weight percent solution of PA-57 in PMOH were added to the above composition, followed by further stirring for 20 minutes. This coating composition was applied to etched ADC lenses, ADC plaques, and 1.7 $R_I$ glass plaques, according to the procedure above, at a withdrawal rate of 2 ipm to provide a cured coating having a thickness of about 2.0 microns, a refractive index of about 1.60, and a Bayer number of 5.9. Exposure of a coated ADC plaque to boiling tap water tint for a period of 30 minutes yielded a coated article with 76 percent L.T.

Thus, it should be apparent that there has been provided in accordance with the present invention a coating composition and a method for making and using same that fully satisfy the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. Changes may be made in the construction and the operation of the various components, elements and assemblies described herein and changes may be made in the steps or the sequence of steps of the methods described herein without departing from the spirit and scope of the invention as defined in the following claims.

What is claimed:

1. A process for providing an abrasion resistant coating on the substrate wherein the abrasion resistant coating has a controlled tintability and a refractive index substantially corresponding to the refractive index of the substrate, the process comprising:

applying to at least one surface of a substrate an effective amount of a coating composition to provide a substantially uniform coating of the coating composition on the substrate, the coating composition comprising an aqueous-organic solvent mixture containing hydrolysis products and partial condensates of an epoxy functional silane, a metal oxide composite colloid, a disilane and a carboxylic acid functional compound wherein the disilane is represented by the formula $(R^{10}O)_x R^{11}_{3-x}Si\text{—}R^{12}_y\text{—}SiR^{13}_{3-x}(OR^{14})_x$; where x is 0, 1, 2 or 3 and y is 0 or 1, $R^{11}$ and $R^{13}$ are H or an alkyl group containing from about 1 to 10 carbon atoms, a functionalized alkyl group, an alkylene group, an aryl group, an alkylpolyether group and combinations thereof, $R^{10}$ and $R^{14}$ are H, an alkyl group containing from about 1 to 10 carbon atoms, an acetyl group, and combinations thereof, wherein if y is 1 then $R^{12}$ can be an alkylene group containing from about 1 to 12 carbon atoms, an alkylenepolyether containing from about 1 to 12 carbon atoms, an aryl group, an alkylene substituted aryl group, an alkylene group which may contain one or more olefins, or an oxygen or sulfur atom, and wherein if x=0 then $R^{11}$ and $R^{13}$ is a chlorine or bromine atom, and wherein the carboxylic acid functional compound is selected from the group consisting of monofunctional carboxylic acids, multifunctional carboxylic acids, anhydrides, and combinations thereof, and wherein the epoxy functional silane is present in a molar ratio to the disilane component and the metal oxide composite colloid component of from about 0.1:1 to 4:1; and curing the coating composition to provide the substrate with a cured coating having controlled tintability and a refractive index substantially corresponding the refractive index of the substrate.

2. The process of claim 1, wherein the hydrolysis products and partial condensates of the epoxy functional silane are present in the aqueous-organic solvent mixture in an amount from about 10 to about 90 weight percent, based on the total solids of the composition.

3. The process of claim 1, wherein the carboxylic acid functional compound is present in the aqueous-organic solvent mixture in an amount of from about 0.01 to 90 weight percent, based on the total weight of the composition.

4. The process of claim 1, wherein the disilane component is present in the aqueous-organic solvent mixture in an amount of from about 0.01 to 85 weight percent, based on the total solids of the composition.

5. The process of claim 1, wherein the metal oxide composite colloid component is present in the aqueous-organic solvent mixture in an amount of from about 0.01 to 80 weight percent based on the total solids of the composition.

6. The process of claim 1, wherein the solvent constituent of the aqueous-organic solvent mixture is selected from the group consisting of an alcohol, an ether, a glycol ether, an ester, a ketone, a glycolether acetate and combinations thereof.

7. The process of claim 1, wherein the solvent constituent of the aqueous-organic solvent mixture is an alcohol having the general formula ROH where R is an alkyl group containing from about 1 to about 10 carbon atoms.

8. The process of claim 1, wherein the solvent constituent of the aqueous-organic solvent mixture is selected from the group consisting of a glycol, an ether, a glycol ether and mixtures thereof having the formula $R^1$—$(OR^2)_x$—$OR^1$ where x is an integer of 0, 1, 2, 3, or 4, $R^1$ is H or an alkyl group containing from about 1 to about 10 carbon atoms and $R^2$ is an alkylene group containing from about 1 to about 10 carbons atoms and combinations thereof.

9. The process of claim 1, wherein the epoxy functional silane is represented by the formula $R^4_x Si(OR^5)_{4-x}$ where x is an integer of 1, 2 or 3, $R^4$ is H, an alkyl group, a functionalized alkyl group, an alkylene group, an aryl group, an alkyl ether, and combinations thereof containing from 1 to about 10 carbon atoms and having at least 1 epoxy functional group, and $R^5$ is H, an alkyl group containing from 1 to about 5 carbon atoms, an acetyl group, a —Si$(OR^6)_{3-y}R^7_y$ group where y is an integer of 0, 1, 2, or 3, where $R^6$ is H, an alkyl group containing from 1 to about 5 carbon atoms an acetyl group, another —Si$(OR^6)_{3-y}R^7_y$ group and combinations thereof, and $R^6$ is H, an alkyl group, a functionalized alkyl group, an alkylene group, an aryl group, an alkyl ether and combinations thereof containing from 1 to about 10 carbon atoms.

10. The process of claim 1, wherein the carboxylic acid functional compound is represented by the formula $R^8(COOR^9)_x$ where x is an integer of 1, 2, 3, or 4, and where $R^8$ is H, an alkyl group, a functionalized alkyl group, an alkylene group, an aryl group, a functionalized aryl group, an alkyl ether, and combinations thereof containing from 1 to about 10 carbon atoms, and where $R^9$ is H, a formyl group, a carbonyl group, or an acyl group, where the acyl group can be functionalized with an alkyl group, a functionalized alkyl group, an alkylene group, an aryl group, a functionalized aryl group, an alkyl ether, and combinations thereof containing from 1 to about 10 carbon atoms, and where $R^8$ and $R^9$ may or may not be joined by a chemical bond.

11. The process of claim 1, wherein the aqueous-organic solvent mixture further comprises alumina, silica, titania, zirconia, tin oxide, antimony oxide, iron oxide, lead oxide, bismuth oxide, and combinations thereof and wherein at least one of the metal oxide components present in the composite mixture is neither alumina nor silica.

12. The process of claim 1, wherein the amount of water present in the aqueous-organic solvent mixture is an amount sufficient to provide a substantially homogeneous mixture of hydrolysis products and partial condensates of all reactive components.

13. The process of claim 12, wherein the aqueous-organic solvent mixture further comprises an effective amount of co-hydrolysis catalyst thereby enhancing the hydrolysis rates of the hydrolyzable components.

14. The process of claim 1, wherein the aqueous-organic solvent mixture further comprises an effective amount of a catalyst thereby providing enhanced abrasion resistance to a coating produced by curing the composition.

15. The process of claim 14, wherein the effective amount of the catalyst is from about 0.01 to about 2 weight percent, based on the total solids of the composition.

16. The process of claim 1 wherein the aqueous-organic solvent mixture further comprises an effective amount of a leveling agent thereby allowing the aqueous-organic solvent mixture to be spread on the substrate thereby providing substantially uniform contact of the aqueous-organic solvent mixture with the substrate.

17. The process of claim 1, wherein the aqueous-organic solvent mixture further comprises from about 0.1 to about 70 weight percent, based on the total solids of the composition, of a mixture of hydrolysis products and partial condensates of a silane additive represented by the formula $R^{15}_x Si(OR^{16})_{4-x}$ where x is an integer of 0, 1, 2 or 3, $R^{15}$ is H, an alkyl group containing from 1 to about 10 carbon atoms, a functionalized alkyl group, an alkylene group, an aryl group an alkyl ether group and combinations thereof, $R^{16}$ is H, an alkyl group containing from 1 to about 10 carbon atoms, an acetyl group and combinations thereof.

18. The process of claim 17, wherein the amount of water present in the aqueous-organic solvent mixture is an amount sufficient to provide a substantially homogeneous mixture of hydrolysis products and partial condensates of all reactive components.

19. The process of claim 18, wherein the aqueous-organic mixture further comprises an effective amount of co-hydrolysis catalyst thereby enhancing the hydrolysis rates of the hydrolyzable components.

20. The process of claim 19, wherein the aqueous-organic mixture further comprises an effective amount of a catalyst thereby providing enhanced abrasion resistance to a cured coating.

21. The process of claim 20, wherein the effective amount of the catalyst is from about 0.01 to about 2 weight percent, based on the total solids of the composition.

22. The process of claim 19, wherein the aqueous-organic solvent mixture further comprises an effective amount of a leveling agent thereby allowing the aqueous-organic solvent mixture to be spread on the substrate thereby providing substantially uniform contact of the aqueous-organic solvent mixture with the substrate.

23. A process for providing a substrate with an abrasion resistant coating wherein the abrasive resistant coating has a refractive index, the process comprising:
providing an aqueous-organic solvent mixture comprising hydrolysis products and partial condensates of an epoxy functional silane, a metal oxide composite colloid, a disilane, a carboxylic acid functional compound wherein the carboxylic acid functional compound is selected from the group consisting of monofunctional carboxylic acids, multifunctional carboxylic acids, anhydrides, and combinations thereof, from about 0.1 to about 70 weight percent, based on the total solids of the composition, of a mixture of hydrolysis products and partial condensates of a silane additive represented by the formula $R^{15}{}_x\text{Si}(OR^{16})_{4-x}$ where x is an integer of 0, 1, 2 or 3, $R^{15}$ is H, an alkyl group containing from 1 to about 10 carbon atoms, a functionalized alkyl group, an alkylene group, an aryl group, an alkyl ether group and combinations thereof, $R^{16}$ is H, an alkyl group containing from 1 to about 10 carbon atoms, an acetyl group and combinations thereof and from about 0.1 to about 70 weight percent, based on the total solids of the composition, of an acidic colloidal silica component wherein the disilane is represented by the formula $(R^{10}O)_x R^{11}{}_{3-x}\text{Si}-R^{12}{}_y-\text{SiR}^{13}{}_{3-x}(OR^{14})_x$, where x is 0, 1, 2 or 3 and y is 0 or 1, $R^{11}$ and $R^{13}$ are H or an alkyl group containing from about 1 to 10 carbon atoms, a functionalized alkyl group, an alkylene group, an aryl group, an alkylpolyether group and combinations thereof, R10 and R14 are H, an alkyl group containing from about 1 to 10 carbon atoms, an acetyl group, and combinations thereof, wherein if y is 1 then $R^{12}$ can be an alkylene group containing from about 1 to 12 carbon atoms, an alkylenepolyether containing from about 1 to 12 carbon atoms, an aryl group, an alkylene substituted aryl group, an alkylene group which may contain one or more olefins, or an oxygen or sulfur atom, and further wherein if x=0, then $R^{11}$ and $R^{13}$ are a chlorine or bromine atom, and wherein the epoxy functional silane is present in a molar ratio to the disilane component and the metal oxide composite colloid component of from about 0.1:1 to 4:1 and the amount of water present in the aqueous-organic solvent mixture is an amount sufficient to provide a substantially homogenous mixture of hydrolysis products and partial condensates of all reactive components;

applying an effective amount of the aqueous-organic solvent mixture to at least one side of the substrate to provide a substantially uniform coating of the aqueous-organic mixture on the at least one side of the substrate; and curing the coating of the aqueous-organic solvent mixture to provide an abrasion resistant coating having a reflective index on at least one side of the substrate.

24. The process of claim 23, further comprising an effective amount of co-hydrolysis catalyst to enhance the hydrolysis rates of the hydrolyzable components.

25. The process of claim 24, further comprising an effective amount of a catalyst thereby providing enhanced abrasion resistance to a cured coating.

26. The process of claim 25, wherein the effective amount of the catalyst is from about 0.01 to about 2 weight percent, based on the total solids of the aqueous-organic solvent mixture.

27. The process of claim 26, wherein the aqueous-organic solvent mixture further comprises an effective amount of a leveling agent thereby allowing the aqueous-organic solvent mixture to be spread on the substrate thereby providing substantially uniform contact of the aqueous-organic solvent mixture with the substrate.

28. A process for providing a substrate with an abrasion resistant coating which has a refractive index, the process comprising:

applying an effective amount of an aqueous-organic solvent mixture to at least one surface of a substrate to form a coating of the aqueous-organic solvent mixture on the at least one surface of the substrate the aqueous-organic solvent mixture contains hydrolysis products and partial condensates of an epoxy functional silane, a metal oxide composite colloid, a disilane and a carboxylic acid functional compound wherein the carboxylic acid functional compound is selected from the group consisting of monofunctional carboxylic acids, multifunctional carboxylic acids, anhydrides, and combinations thereof wherein the disilane is represented by the formula $(R^{10}O)_x R^{11}{}_{3-x}\text{Si}-R^{12}{}_y-\text{SiR}^{13}{}_{3-x}(OR^{14})_x$, where x is 0, 1, 2 or 3 and y is 0 or 1, $R^{11}$ and $R^{13}$ are H or an alkyl group containing from about 1 to 10 carbon atoms, a functionalized alkyl group, an alkylene group, an aryl group, an alkylpolyether group and combinations thereof, R10 and R14 are H, an alkyl group containing from about 1 to 10 carbon atoms, an acetyl group, and combinations thereof, wherein if y is 1 then $R^{12}$ can be an alkylene group containing from about 1 to 12 carbon atoms, an alkylenepolyether containing from about 1 to 12 carbon atoms, an aryl group, an alkylene substituted aryl group, an alkylene group which may contain one or more olefins, or an oxygen or sulfur atom, and further wherein if x=0, then $R^{11}$ and $R^{13}$ are a chlorine or bromine atom, and further wherein the epoxy functional silane is present in a molar ratio to the disilane component and the metal oxide composite colloid component of from about 0.1:1 to 4:1; and from about 0.1 to about 70 weight percent, based on the total solids of the aqueous-organic solvent mixture of a colloidal silica component, and wherein the colloidal silica component is acidic, basic or neutral; and curing the coating of the aqueous-organic solvent mixture on the at least one surface of the substrate to provide the substrate with an abrasion resistant coating.

29. The process of claim 28, wherein the colloidal silica component is an acidic colloidal component.

30. The process of claim 29, wherein the amount of water present in the aqueous-organic solvent mixture is an amount sufficient to provide a substantially homogeneous mixture of hydrolysis products and partial condensates of all reactive components.

31. The process of claim 30, wherein the aqueous-organic solvent mixture further comprises an effective amount of co-hydrolysis catalyst thereby enhancing the hydrolysis rates of the hydrolyzable components.

32. The process of claim 31, wherein the aqueous-organic solvent mixture further comprises an effective amount of a catalyst thereby providing enhanced abrasion resistance to a cured coating.

33. The process of claim 32, wherein the effective amount of the catalyst is from about 0.01 to about 2 weight percent, based on the total solids of the aqueous-organic solvent mixture.

34. A process for providing an abrasion resistant coating on the substrate which has a refractive index, the process comprising:

applying to at least one surface of substrate an effective amount of an aqueous-organic solvent mixture containing hydrolysis products and partial condensates of an epoxy functional silane, a metal oxide composite colloid, a disilane, a carboxylic acid functional compound and from about 0.1 to about 70 weight percent, based on the total solids of the aqueous-organic solvent mixture, of a mixture of hydrolysis products and partial condensates of a silane additive represented by the formula $R^{15}{}_x\text{Si}(OR^{16})_{4-x}$ where x is an integer of 0, 1, 2 or 3, $R^{15}$ is H, an alkyl group containing from 1 to about 10 carbon atoms, a functionalized alkyl group, an alkylene group, an aryl group an alkyl ether group and combinations thereof, $R^{16}$ is H, an alkyl group containing from 1 to about 10 carbon atoms, an acetyl group and combinations thereof and wherein the disilane is represented by the formula $(R^{10}O)_x R^{11}{}_{3-x}Si-R^{12}{}_y-SiR^{13}{}_{3-x}(OR^{14})_x$, where x is 0, 1, 2 or 3 and y is 0 or 1, $R^{11}$ and $R^{13}$ are H or an alkyl group containing from about 1 to 10 carbon atoms, a functionalized alkyl group, an alkylene group, an aryl group, an alkylpolyether group and combinations thereof, R10 and R14 are H, an alkyl group containing from about 1 to 10 carbon atoms, an acetyl group, and combinations thereof, wherein if y is 1 then $R^{12}$ can be an alkylene group containing from about 1 to 12 carbon atoms, an alkylenepolyether containing from about 1 to 12 carbon atoms, an aryl group, an alkylene substituted aryl group, an alkylene group which may contain one or more olefins, or an oxygen or sulfur atom, and further wherein if x=0, then $R^{11}$ and $R^{13}$ are a chlorine or bromine atom, wherein the carboxylic acid functional compound is selected from the group consisting of monofunctional carboxylic acids, multifunctional carboxylic acids, anhydrides, and combinations thereof, and wherein the epoxy functional silane is present in a molar ratio to the disilane component and the metal oxide composite colloid component of from about 0.1:1 to 4:1; and from about 0.1 to about 70 weight percent, based on the total solids of the composition, of a colloidal silica component, wherein the colloidal silica component is acidic, basic or neutral; and curing the aqueous-organic solvent mixture to produce a substrate having an abrasion resistant coating having a refractive index substantially corresponding to the refractive index of the substrate.

* * * * *

UNITED STATES PATENT AND TRADEMARK OFFICE
CERTIFICATE OF CORRECTION

PATENT NO. : 7,001,642 B2 Page 1 of 1
APPLICATION NO. : 10/706551
DATED : February 21, 2006
INVENTOR(S) : Karl W. Terry and Bryan S. Lembo It is certified that error appears in the above-identified patent and that said Letters Patent is hereby corrected as shown below:

Column 4, line 10: Delete the word "piano" and replace with the word -- plano --

In the Claims:
Column 19, line 20: Delete "R10 and R14" and replace with -- $R^{10}$ and $R^{14}$ --

Column 20, line 15: Delete "R10 and R14" and replace with -- $R^{10}$ and $R^{14}$ --

Column 21, line 13: Delete "R10 and R14" and replace with -- $R^{10}$ and $R^{14}$ --

Signed and Sealed this

Tenth Day of April, 2007

JON W. DUDAS
*Director of the United States Patent and Trademark Office*